United States Patent [19]

Griffiths et al.

[11] Patent Number: 4,634,817
[45] Date of Patent: Jan. 6, 1987

[54] TROLLEY POLE RAISING AND LOWERING APPARATUS

[75] Inventors: Thomas W. Griffiths; Vladimir Suris, both of Lexington, Ohio

[73] Assignee: Harvey Hubbell Incorporated, Orange, Conn.

[21] Appl. No.: 792,889

[22] Filed: Oct. 30, 1985

[51] Int. Cl.⁴ .............................................. B60L 5/12
[52] U.S. Cl. ........................................ 191/67; 191/87
[58] Field of Search ...................... 191/64, 66, 67, 68, 191/70, 85, 86, 87, 90

[56] References Cited

U.S. PATENT DOCUMENTS

| | | | |
|---|---|---|---|
| 832,544 | 10/1906 | French | 191/87 X |
| 1,075,349 | 10/1913 | Gay | 191/70 |
| 1,447,217 | 3/1923 | Lincoln | 191/68 |
| 1,733,073 | 10/1929 | Prelesnik | 191/70 |
| 2,117,030 | 5/1938 | Larsson | 191/85 |
| 3,547,237 | 12/1970 | Ives | 191/66 X |

FOREIGN PATENT DOCUMENTS

| | | | |
|---|---|---|---|
| 0047819 | 3/1982 | European Pat. Off. | 191/67 |
| 611596 | 4/1935 | Fed. Rep. of Germany | 191/67 |
| 607554 | 7/1926 | France | 191/70 |

Primary Examiner—Robert B. Reeves
Assistant Examiner—David F. Hubbuch
Attorney, Agent, or Firm—Jerry M. Presson; Walter C. Farley

[57] ABSTRACT

A trolley pole is supported on a vertical shaft so as to be rotatable from side to side while in its elevated, operating position. The shaft is supported on a support structure which is tiltably mounted on a base plate on a vehicle. The base plate can be tilted by extending the arm of a linear actuator. When the base plate is tilted, the pole is lowered and centered and a gravity operated latch structure comes into effect to maintain the pole centered whenever it is not in its operating position. A control circuit coupled to the actuator extends and retracts the actuator arm to pivot the support structure between an upright and a stowed position.

15 Claims, 6 Drawing Figures

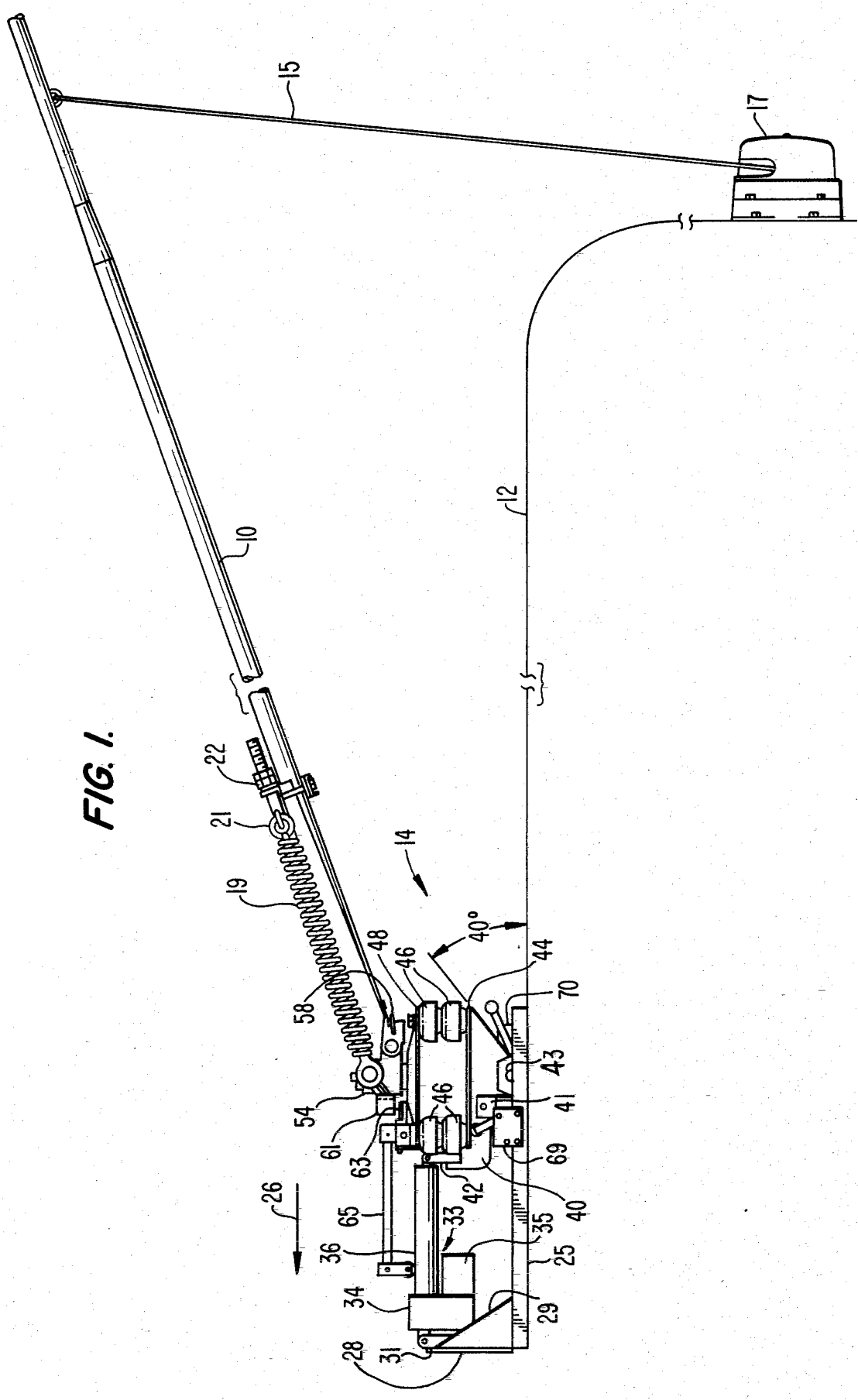

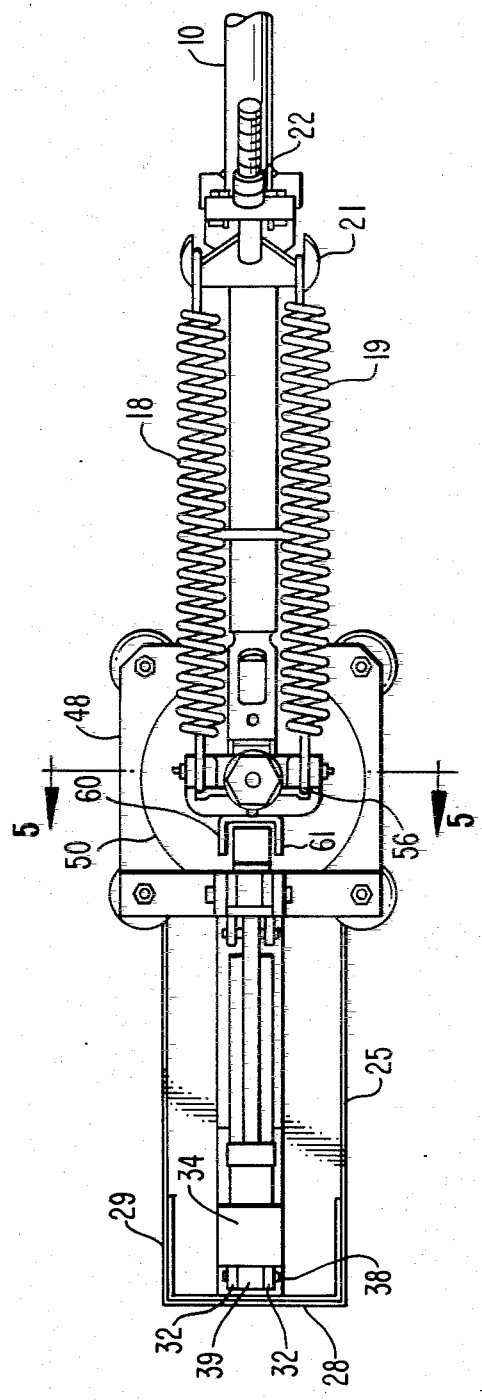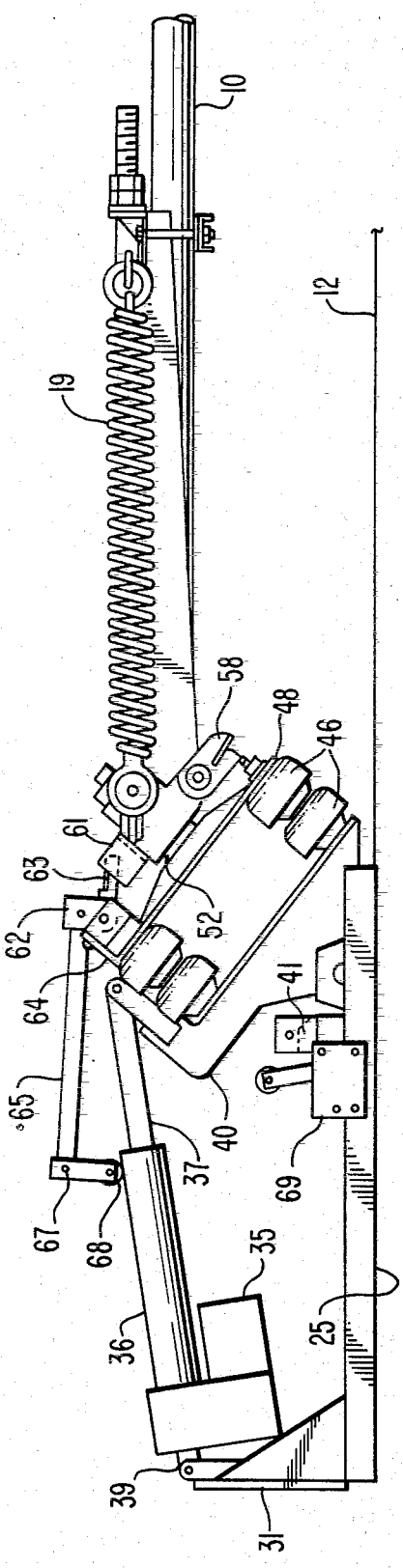

4,634,817

TROLLEY POLE RAISING AND LOWERING APPARATUS

This invention relates to an improved apparatus for controlling the movement of a trolley pole into and out of contact with an overhead wire and for the positioning of the pole when it is partly or fully lowered.

BACKGROUND OF THE INVENTION

There are various circumstances under which a trolley pole must be lowered after which the vehicle on which it is mounted continues to move, either by obtaining power through another trolley pole or by using some alternative motive force. It is important to control the location of the pole as it is lowered and to keep it centered, but no suitable apparatus for this purpose exists.

In addition, it is desirable to have a convenient apparatus for raising the pole and for guiding it during the raising process so that the current collecting harp at the end of the pole is in contact with the wire to provide th motive power for the vehicle.

SUMMARY OF THE INVENTION

Accordingly, an object of this invention is to provide an apparatus for controlling the lowering of a trolley pole to a safe, centered stowed position and to keep the pole centered when it is lowered, despite forces tending to move the pole from side to side.

A further object is to provide such as apparatus which is usable to elevate and guide the pole to its operating position.

Another object is to provide a pivot mechanism driven by a light-weight actuator for raising and lowering the pole.

A still further object is to provide a simple and reliable control circuit for operating the actuator.

Yet another object is to provide such an apparatus which accomplishes the function of lowering and stowing the pole without further extension of the trolley base springs, thereby prolonging the life of those springs.

Briefly described, the invention includes a current collector apparatus comprising the combination of a base plate mountable on a vehicle; a trolley pole support structure pivotably mounted on the base plate for pivotal movement about a substantially horizontal axis; and a trolley pole pivotably mounted on the support structure for movement about a second substantially horizontal axis. Springs means are coupled between the support structure and the pole for urging the pole toward a raised position. An actuator is mounted on the base plate and has an extendable arm connected to the support structure for pivoting the support structure about the first horizontal axis between an upright position and a tilted, stowed position. Control means is provided for selectively energizing the actuator to extend or retract the arm.

The apparatus also preferably includes a centering mechanism including a collar forming part of the support structure, the collar being rotatable about a generally vertical axis and having a recess which faces radially away from its axis of rotation. A latch member is pivotably mounted on the support structure and extends below the recess when the support structure is in its upright position so that, when the support structure is tilted away from the full upright position the latch member enters the recess and substantially prevents rotation of the collar.

In order to impart full understanding of the manenr in which these and other objectives are attained in accordance with the invention, particularly advantageous embodiments thereof will be described with reference to the accompanying drawings, which form a part of this specification, and wherein:

FIG. 1 is a partially foreshortened side elevation of a portion of a vehicle with an apparatus in accordance with the invention mounted thereon;

FIG. 2 is a partial top plan view of the pole elevating and lowering apparatus of FIG. 1;

FIG. 3 is a side elevation of the apparatus of FIG. 2 with the mechanism in the lowered, stowed position;

Figure 4:
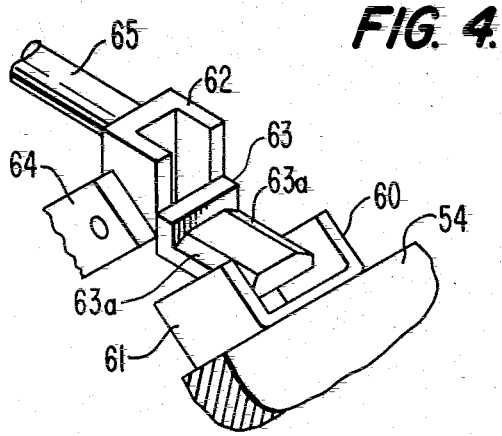
FIG. 4 is a perspective, partly sectional view of the latch mechanism portion of the apparatus.

Referring first to FIGS. 1-5, it will be seen that a trolley pole 10 is mounted on a vehicle 12 by a raising and lowering support mechanism indicated generally at 14. Pole 10 is conventional in that it is an elongated, substantially rigid member having a degree of flexibility so as to suitably support a current collector at the distal end thereof in a position to contact an overhead wire, in a manner well known in this art, so as to act as a current collector. The harp and the associated current-carrying wires are omitted from the figures herein because they are fully conventional and because their omission simplifies the illustrations.

A cable 15 is connected to an intermediate point on the pole and leads to a retracting mechanism 17 which accepts cable as the pole is lowered, the cable and retractor acting to maintain proper conditions concerning the relationship of the harp to the overhead wire under normal operating circumstances. Again, the cable and retractor are fully conventional.

The apparatus also includes base springs 18 and 19 which are connected between a location on the pole and a location on the base structure, which will be further described, for the purpose of urging the pole toward its elevated position to keep the current-collecting harp in contact with the overhead wire under normal operating conditions. At the pole end, the springs are connected to opposite ends of a double hook 21 which is attached to an adjusting mechanism 22, this attachment also being conventional in nature.

The support mechanism in accordance with the invention includes a base plate 25 which is fixedly attached, as by a plurality of machine screws or bolts, to the upper surface of vehicle 12. Plate 25 is in the shape of an elongated rectangle the longitudinal central axis of which is aligned with the fore-and-aft axis of vehicle 12, i.e., with the direction of motion of the vehicle which is indicated by arrow 26. At the forward end of plate 25 is a bracket 28 having an end plate and triangular side brace plates 29, the plates 29 being rigidly attached to base plate 25 as by welding. Bracket 28 also includes a vertically extending central post 31 with ears 32 at its upper end which have a transverse hole extending therethrough.

An actuator indicated generally at 33 includes a gearbox 34, a motor 35 and an elongated actuator arm housing 36 which contains an extendible arm 37, best seen in FIG. 3. Gearbox 34 has a post 39 extending from the forward surface thereof between ears 32, the post having an opening therethrough aligned with the openings in ears 32 to receive a pivot pin 38 so that gearbox 34 is pivotally connected to post 31 and can swing upwardly, as required, and downwardly to a limited extend, the downward motion being limited by limits on the movement of the base structure.

Actuator 33 is, in itself, a conventional kind of electrically driven linear actuator which is particularly advantageous for the present apparatus because it is light in weight, has high output force and high efficiency and also is operated using a 12 volt DC reversible motor. An actuator of a suitable type is manufactured by the Warner Electric Brake and Clutch Company of South Beloit, Ill. Such actuators make use of the ball screw type of mechanism as shown in U.S. Pat. Nos. 4,266,437 and 4,286,793. Other forms of actuators can be used.

At the rear end of base 25 is a transversely extending axle 43 which rotatably supports a vertically oriented pivot plate 40. An upwardly extending stop member 41 is fixedly attached to plate 25 and has a central groove with a stop surface, see FIG. 5, which contacts the lower forward edge of pivot plate 40, establishing the forward, operating position of the support structure. Stop 41 also provides lateral support for plate 40 in the operating position and establishes the limit on downward movement of gearbox 34. At the forward end of plate 40 is an upwardly extending link 42 which is pivotally attached to the rear end of extendable arm 37. A horizontal support plate 44 is fixedly attached to pivot plate 40 and supports four sets of insulators 46 which, in turn, support a second generally horizontal support plate 48. Plates 44 and 48 are held in parallel relationship with each other by the interconnected insulators. Plate 48 has a generally circular conical portion 50 in which is fixedly mounted a vertically extending shaft 52 which receives a rotatable collar 54.

Collar 54 is provided with a yoke 56 to which the forward ends of springs 18, 19 are attached and also has a rearwardly protruding bracket 58 to which the end of pole 10 is pivotally connected.

A normally closed limit switch 69 is attached to base plate 25 in a position such that plate 44 comes in contact with the actuating arm of the limit switch when the pole reaches its elevated position. As will be described, a circuit for motor 35 is energized through switch 69 so that when the support structure reaches the desired position the switch is opened and the motor is deenergized. A second limit switch 70 is positioned so that its actuator arm is contacted by plate 44 when the support structure reaches the tilted position. Again, when switch 70 is opened, the motor is deenergized and motion is stopped.

The apparatus thus far described forms the basic mechanism for lowering pole 10 in the desired manner. When motor 35 is energized, actuator 33 is caused to extend its extendable arm 37, pushing on link 42 and pivoting plate 40 about the axis of axle 43, thereby tilting the support structure including plates 44 and 48, shaft 52 and collar 54 toward the rear of the vehicle, tilting the vertical axis about which collar 54 is rotatable and lowering the pole. Several events occur during this lowering which are of interest. One is that, by tilting the collar and shaft 52, the pole is caused to automatically move to the center position under the force of gravity. A second important benefit is that the lowering is accomplished without further extension of springs 18 and 19 as is common practice. In fact, the lowering allows the springs to contract, thereby significantly lengthening the spring life by lowering stress in the springs. Additionally, because the actuator 33 is of a type which resists forces applied to its extendable arm, the structure is essentially locked in the tilted position simply by deenergizing motor 35. Cable 15 is, of course, retracted by retractor 17.

Although pole 10 is centered automatically by the tilting action, it is apparent that the pole would not remain in the center position if subjected to lateral forces by the movement of vehicle 12. A simple but highly effective centering device is therefore provided, this device also performing the important function of guiding the pole in its travel upwardly from the stowed position to the point of harp contact with the trolley wire. The centering structure is shown in FIG. 4 and includes a pair of forwardly protruding ears 60 and 61 which are fixedly attached to collar 54 and extend parallel with each other from that collar, thereby defining a recess. A centering latch arm 62 is pivotally connected to a bracket 64 at the forward end of plate 48, arm 62 having a latch member 63 protruding rearwardly from the pivot point and a balance arm 65 extending forwardly therefrom. Balance arm 65 has a head 67 at the distal end thereof, the lower end of the head having a roller 68 which rests on and rides along the upper surface of actuator arm housing 36. Arm 65 is a rod of electrically nonconductive material such as fiberglass which provides electrical insulation and also serves as a flexible element facilitating unlatching action of the centering device during the upward travel of the pole from the stowed to the operating position.

As will be seen in FIG. 1, latch member 63 is positioned directly below the recess formed by ears 60 and 61 when the apparatus is in the operating position with pole 10 elevated and plates 44 and 48 in their horizontal positions. Thus, collar 54 is free to rotate, permitting pole 10 to swing from side to side as necessary to maintain its current-collecting harp in contact with the overhead wire.

However, when the support structure including plates 44 and 48 is tilted, thereby also tilting shaft 52 and bringing pole 10 to its center position, the pivot point between bracket 64 and latch arm 62 is elevated relative to the recess, causing latch member 63 to enter the recess as shown in FIG. 4. The upper surface of latch 63 is preferably beveled as shown at 63a to perform a camming action and thereby widen its range of engagement with the recess between ears 60 and 61 as those ears swing across above latch member 63 while the pole is being lowererd. The width of latch member 63 is selected to be only slightly smaller than the width of the recess so that as soon as the latch member has entered the recess lateral motion of the pole is restricted to extremely small dimensions, thereby essentially preventing the pole from leaving its center position. In the fully stowed position illustrated in FIG. 3, the latch member remains within the recess, keeping the pole centered as desired.

Head 67 and roller 68 can be weighted to allow the centering latch to perform its task simply by the force of gravity. If necessary, arm 65 can, of course, be manually lifted to release the latch and to permit the pole to be moved to one side or the other for service or the like.

Figure 6:
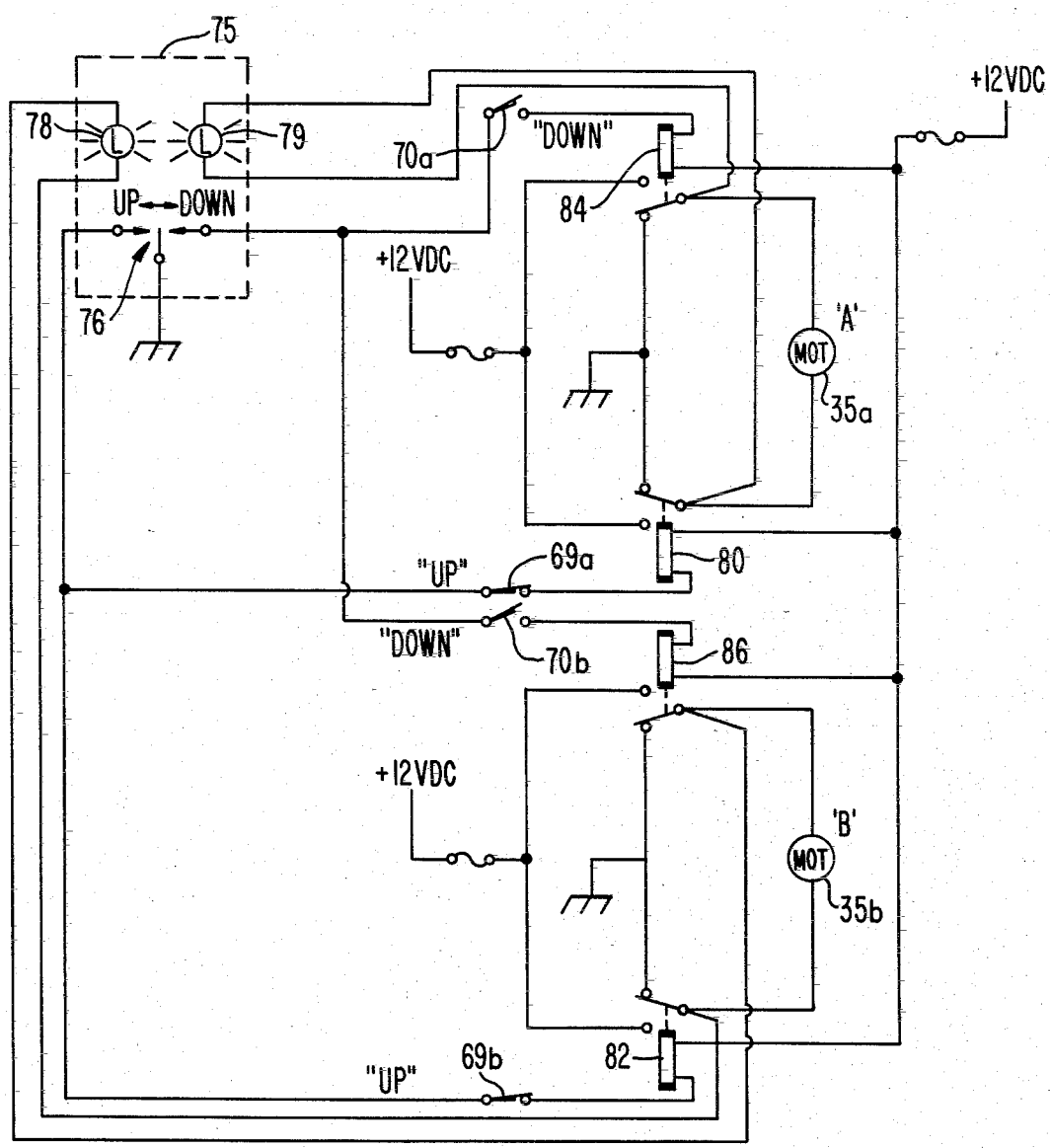
FIG. 6 is a schematic electrical circuit diagram of a control circuit for operating the apparatus of FIGS. 1-5.
Figure 5:
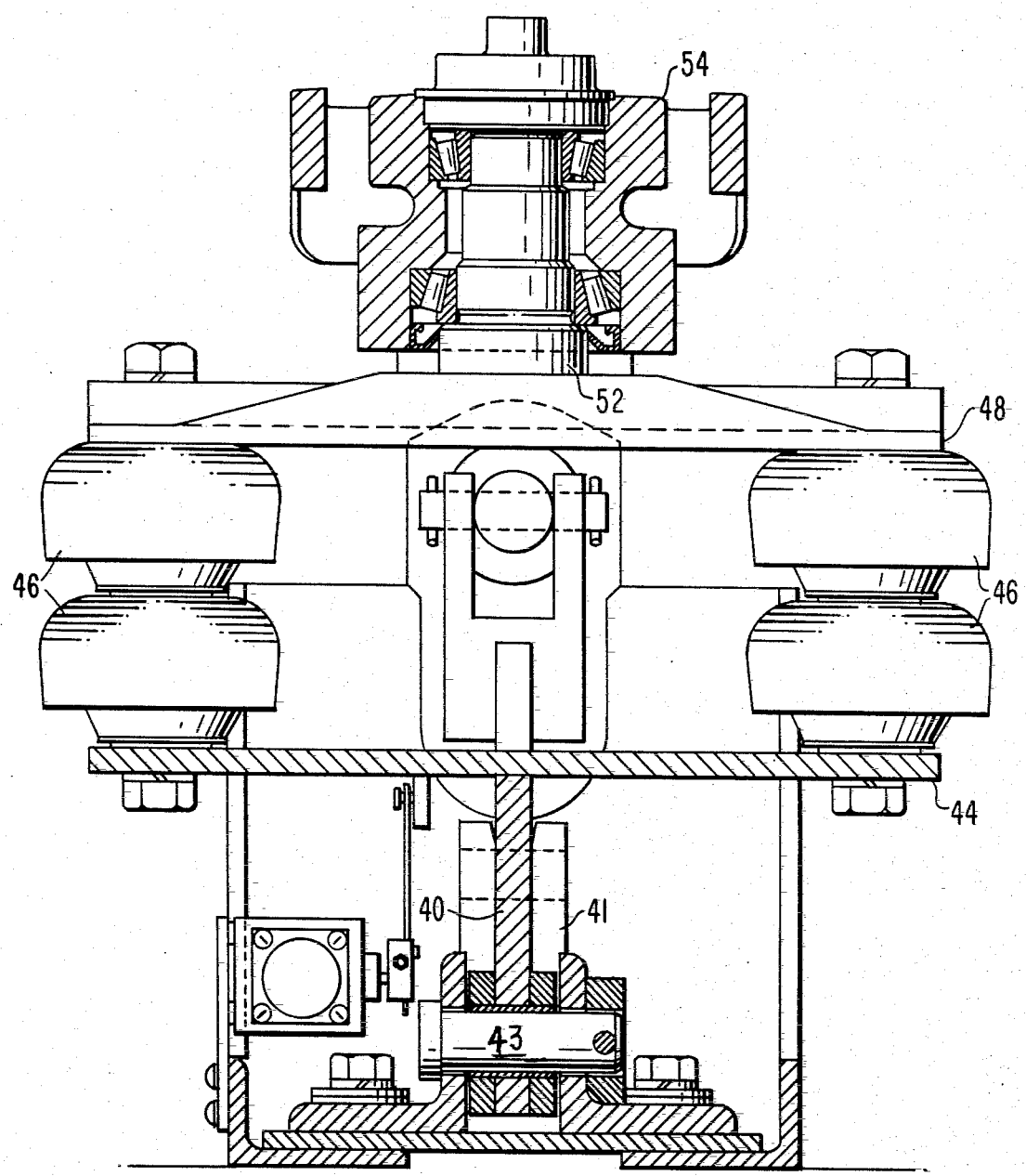
FIG. 5 is a transverse sectional view along line 5—5 of FIG. 2.

FIG. 6 schematically illustrates an electrical circuit which is usable to control the operation of the apparatus shown in FIGS. 1-5. The circuit of FIG. 6 illustrates a typical control system used to operate two trolley poles rather than one, the operating mechanisms simply being connected essentially in parallel. The two trolley poles are identified as A and B and the actuators for them are operated by motors 35a and 35b. As will be recognized, the schematic diagram of FIG. 6 does not, in most cases, bear any realistic relationship to the physical proximity of the various components.

A control panel 75 is available to the operator and includes a manually operable switch indicated generally at 76 which has a grounded movable center contact and two fixed contacts, either one of which can be selectively grounded by the operator. The control panel also includes indicator lights 78 and 79 which inform the operator that power is being applied to both motors in response to closing switch 76 in either direction. The relays in FIG. 6 are shown in their deenergized conditions.

The fixed contact on the "up" side of switch 76 is connected through the normally closed "up" limit switch 69a to one terminal of the energizing winding 80 of an electromagnetic relay, the other terminal of that winding being connected to a positive 12 volt DC source. The source is preferably a bank of batteries so that the apparatus can be operated regardless of whether the trolley harp is in contact with a wire or any other source is available. The "up" contact of switch 76 is similarly connected through "up" limit switch 69b to the energizing winding 82 of a relay, the other terminal of which is also connected to the 12 volt source. It will be assumed, for the moment, that the pole is in the down position.

The "down" contact of switch 76 is connected through limit switches 70a and 70b to the terminals of energizing windings 84 and 86, respectively, the other terminals of which are also connected to the 12 volt DC source. It will be observed that limit switches 70a and 70b are open while limit switches 69a and 69b are closed which would be the proper condition with the pole in its down position.

Each of relays 80, 82, 84 and 86 operates a single-pole, double-throw set of contacts with the normally closed contacts being connected to ground and the normally open contacts being connected to the 12 volt DC source. In addition, it will be observed that the movable contacts of the relays are connected to the motor, the movable contact of relay 80 being connected to one side of motor 35a and the movable contact of relay 84 being connected to the other side of that same motor. Similarly, the movable contacts of relay 82 and 86 are connected respectively to the opposite sides of motor 35b. Still further, it will be observed that light 78 is connected in parallel with motor 35b while light 79 is connected in parallel with motor 35a. Thus, with the relays in their deenergized positions, both sides of both motors are simply grounded.

When switch 79 is moved to its "up" position, one side of relay winding 80 and one side of relay winding 82 are grounded, thus energizing those relays and moving their respective contacts to the opposite position. This applies 12 volts to one side of each of the motors, causing the motors to move in the proper direction to operate their respective actuators for the purpose of elevating the poles. As soon as the support structures have moved a sufficient amount, switches 70A and 70B are closed but this has no effect since the movable contact of switch 76 is in the "up" position. When the pole has reached its operating position, equivalent to that shown in FIG. 1, switches 69a and 69b are opened, removing the ground from energizing windings 80 and 82, thus deenergizing those windings and stopping the operation of motors 35a and 35b. The circuit is then returned to the condition illustrated in FIG. 6 except for the positions of the limit switches which are opposite to those shown. Moving switch 76 to the "down" position thus energizes relays 84 and 86 by grounding one side of each energizing winding, thus applying 12 volts to the opposite sides of motors 35a and 35b, causing them to rotate in the reverse direction, thereby extending the actuator arms and tilting the support structures until they reach the position shown in FIG. 3. The limit switches are then returned to the positions shown in FIG. 6 and the circuits are deenergized. As will be recognized, lamps 78 and 79 are energized whenever the motors are energized, regardless of polarity.

While one advantageous embodiment has been chosen to illustrate the invention it will be understood by those skilled in the art that various changes and modifications can be made therein without departing from the scope of the invention as defined in the appended claims.

What is claimed:

1. A current collector apparatus comprising the commbination of
    a base plate mountable on a vehicle;
    a trolley pole support structure pivotably mounted on said base plate for pivotal movement about a first substantially horizontal axis;
    a trolley pole pivotably mounted on said support structure for movement about a second substantially horizontal axis;
    spring means coupled between said support structure and said pole for urging said pole toward a raised position;
    an actuator mounted on said base plate, said actuator having extendible arms means connected to said support structure for pivoting said support structure about said first horizontal axis between an upright position and a tilted, stowed position;
    control means for selectively energizing said actuator to extend and retract said extendible arm means;
    a pole support collar mounted for rotation about an axis which is substantially vertical when said support structure is in said upright position, said trolley pole being pivotably mounted on said collar;
    means on said collar defining a recess facing radially away from said substantially vertical axis; and
    a latch member pivotably mounted on said support structure and extending below said recess in said upright position so that, when said support structure is tilted away from said upright position, said latch member enters said recess and substantially prevents rotation of said collar.

2. An apparatus according to claim 2 wherein said support structure includes
    a support plate which is generally horizontal when said support structure is in said upright position;
    an upwardly extending shaft fixedly attached to said support plate, said collar being rotatably mounted on said shaft; and
    a bracket on said support plate for pivotably supporting said latch member.

3. An apparatus according to claim 2 and further comprising;
    an arm housing mounting said extendible arm means and wherein said latch member further includes a balance member extending away from said recess above said actuator, said balance member having a roller for riding on said arm housing when said support structure tilts toward said stowed position.

4. An apparatus according to claim 1 wherein said latch member further includes a balance member extending away from said recess above said actuator, said balance member having a roller for riding on said extendible arm means when said support structure tilts toward said stowed position.

5. An apparatus according to claim 1 wherein
said actuator comprises a reversible DC motor and means connected to said motor for driving said extendible arm means,
and wherein said control means comprises
a source of DC current;
first relay circuit means for connecting source to said motor with a first polarity when said first relay circuit means is energized;
second relay circuit means for connecting said source to said motor with the opposite polarity when said second relay circuit means is energized; and
manually operable switch means for selectively connecing one but not both of the energizing circuits of said first and second relay circuit means to said source for energization.

6. An apparatus according to claim 5 wherein said control means further comprises
a first normally closed limit switch mounted on said base in a position to be contacted by said support structure at said stowed position,
said first limit switch being connected in the energizing circuit of said first relay circuit means to interrupt the energization of said first relay circuit means to thereby deenergize said motor; and
a second normally closed limit switch mounted on said base in a position to be contacted by said support structure at said upright position,
said second limit switch being connected in the energizing circuit of said second relay circuit means to interrupt the energization of said second relay circuit means to thereby denergize said motor.

7. An apparatus according to claim 6 wherein said support structure includes
a pole support collar mounted for rotation about an axis which is substantially vertical when said support structure is in said upright position, said trolley pole being pivotably mounted on said collar;
means on said collar defining a recess facing away from said substantialy vertical axis;
a latch member pivotably mounted on said support structure and extending below said recess in said upright position so that, when said support structure tilts away from said upright position said latch member enters said recess and substantially prevents rotation of said collar.

8. An apparatus according to claim 7 wherein said support structure includes
a support plate which is generally horizontal when said support structure is in said upright position;
an upwardly extending shaft fixedly attached to said support plate, said collar being rotatably mounted on said shaft; and
a bracket on said support plate for pivotably supporting said latch member.

9. An apparatus according to claim 8 wherein said latch member further includes a balance member extending away from said recess above said actuator, said balance member having a roller for riding on said extendible arm means when said support structure tilts toward said stowed position.

10. An apparatus according to claim 6 wherein
said base plate is mountable on said vehicle with its longitudinal axis in a specific orientation relative to the direction of travel of said vehicle with a leading end and a trailing end corresponding to said direction;
said base plate has an upwardly extending mounting bracket at said leading end for supporting said actuator;
said actuator comprises a housing pivotably connected to said mounting bracket with said extendible arm means protruding parallel with said longitudinal axis toward said support structure; and
said support structure includes a vertical pivot plate pivotably connected to the trailing end of said arm, means said pivot plate also being pivotably attached to said base plate near the trailing end of said base plate so that extension of said arm means causes said pivot plate to pivot rearwardly about said first substantially horizontal axis.

11. An apparatus according to claim 10 wherein said support structure further includes a support plate mounted on said pivot plate, said support plate being perpendicular to said pivot plate and being substantially horizontal when said arm is retracted,
a shaft extending upwardly from said support plate, and
a collar rotatably mounted on said shaft, said pole being pivotably connected to said collar;
and wherein said spring means comprises
an extension coil spring having one end attached to said collar and the other end attached to an upper portion of said pole.

12. An apparatus according claim 11 and further including a center latching mechanism comprising
a bracket at the forward end of said support plate;
a latch arm pivotally mounted in said bracket for pivotal movement about an axis perpendicular to the axis of said shaft,
said latch arm having a forwardly extending portion lying directly above said extendible arm means and a rearwardly extending portion protruding toward said collar, and
a roller on said forwardly extending portion riding on said extendible arm means; and
first and second tabs mounted on said collar and defining a recess for receiving said rearwardly extending portion when said pole is centered in a plane containing said longitudinal axis of said base and said support structure is tilted so that the engagement of said rearwardly extending portion with said recess keeps said pole centered.

13. A current collector apparatus comprising the combination of
a base plate mountable on a vehicle;
a trolley pole support structure pivotably mounted on said base plate for pivotal movement about a first substnatially horizontal axis;
a trolley pole pivotably mounted on said support structure for movement about a second substantially horizontal axis;
spring means coupled between said support structure and said pole for urging said pole toward a raised position;

an actuator mounted on said base plate, said actuator having extendible arms means connected to said support structure for pivoting said support structure about said first horizontal axis between an upright position and a tilted, stowed position;

control means for selectively energizing said actuator to extend and retract said extendible arm means;

said base plate being mountable on said vehicle with its longitudinal axis in a specific orientation relative to the direction of travel of said vehicle with a leading end and a trailing end corresponding to said direction;

said base plate has an upwardly extending mounting bracket at said leading end for supporting said actuator;

said actuator comprises a housing pivotably connected to said mounting bracket with said extendible arm means protruding parallel with said longitudinal axis toward said support structure; and said support structure includes a vertical pivot plate pivotably connected to the trailing end of said extendible arm means said pivot plate also being pivotably attached to said base plate near the trailing end of said base plate so that extension of said arm means causes said pivot plate to pivot rearwardly about said first substantially horizontal axis.

14. An apparatus according to claim 13 wherein said support structure further includes a support plate mounted on said pivot plate, said support plate being perpendicular to said pivot plate and being substantially horizontal when said arm is retracted, a shaft extending upwardly from said support plate, and a collar rotatably mounted on said shaft, said pole being pivotable connected to said collar;

and wherein said spring means comprises an extension coil spring having one end attached to said collar and the other end attached to an upper portion of said pole.

15. An apparatus according to claim 14 and further including a center latching mechanism comprising a bracket at the forward end of said support plate;

a latch arm pivotally mounted in said bracket for pivotal movement about an axis perpendicular to the axis of said shaft, said latch arm having a forwardly extending portion lying directly above said extendible arm means and a rearwardly extending portion protruding toward said collar, and a roller on said forwardly extending portion riding on said extendible arm means; and first and second tabs mounted on said collar and defining a recess for receiving said rearwardly extending portion when said pole is centered in a plane containing said longitudinal axis of said base and said support structure is tilted so that the engagement of said rearwardly extending portion with said recess keeps said pole centered.

* * * * *